United States Patent [19]

Tensor

[11] Patent Number: 5,700,015

[45] Date of Patent: Dec. 23, 1997

[54] RUBBER/METAL COMBUSTION SEAL

[75] Inventor: Paul M. Tensor, Lombard, Ill.

[73] Assignee: Dana Corporation, Toledo, Ohio

[21] Appl. No.: 721,646

[22] Filed: Sep. 26, 1996

[51] Int. Cl.[6] .................................................. F16J 15/12
[52] U.S. Cl. ........................ 277/180; 277/211; 277/213; 277/235 B
[58] Field of Search ........................ 277/180, 189, 277/209, 211, 213, 235 B

[56] References Cited

U.S. PATENT DOCUMENTS

| 494,402 | 3/1893 | Walsh | 277/211 |
|---|---|---|---|
| 805,645 | 11/1905 | Guillot | 277/213 |
| 2,307,440 | 1/1943 | Wilson | 277/211 |
| 3,053,544 | 9/1962 | Gorsica | 277/180 |
| 3,332,566 | 7/1967 | Phillips | 277/213 |
| 3,930,656 | 1/1976 | Jelinek | 277/180 |
| 4,140,323 | 2/1979 | Jacobs | 277/235 B |
| 4,155,561 | 5/1979 | Rudy et al. | 277/235 B |
| 4,203,608 | 5/1980 | Nicholson | 277/213 |
| 4,272,085 | 6/1981 | Fujikawa et al. | |
| 4,635,949 | 1/1987 | Lucas et al. | 277/211 |
| 4,867,462 | 9/1989 | Udagawa | 277/213 |
| 4,964,293 | 10/1990 | Inoue et al. | 277/213 |
| 5,201,534 | 4/1993 | Miyaoh . | |
| 5,267,740 | 12/1993 | Stritzke . | |
| 5,322,299 | 6/1994 | Terai . | |
| 5,430,385 | 7/1995 | Hutton et al. | 277/180 |
| 5,558,347 | 9/1996 | Nicholson | 277/213 |

FOREIGN PATENT DOCUMENTS

| 3523151 | 1/1987 | Germany | 277/235 B |
|---|---|---|---|
| 191949 | 1/1923 | United Kingdom | 277/213 |

*Primary Examiner*—Scott Cummings
*Attorney, Agent, or Firm*—Rader, Fishman and Grauer

[57] ABSTRACT

A combustion seal for a cylinder head gasket of an internal combustion engine includes a corrugated rigid carrier having a radially extending base portion, the radially innermost peripheral edge defining a portion of a cylinder bore opening, and three channels defined radially inwardly of the base portion and radially outwardly of the inner peripheral edge. The radially innermost and outermost channels open in a first axial direction while the channel disposed between them opens in the opposite axial direction. An elastomeric ring is received in all but the radially outermost channel, first face of the rings in facial contact with a root of the channel and an opposing second face defined outwardly of the channels when the seal is in a relaxed state. When the gasket is installed, the elastomeric rings elastically compress to become generally flush with the walls of the channel in which they are received.

21 Claims, 1 Drawing Sheet

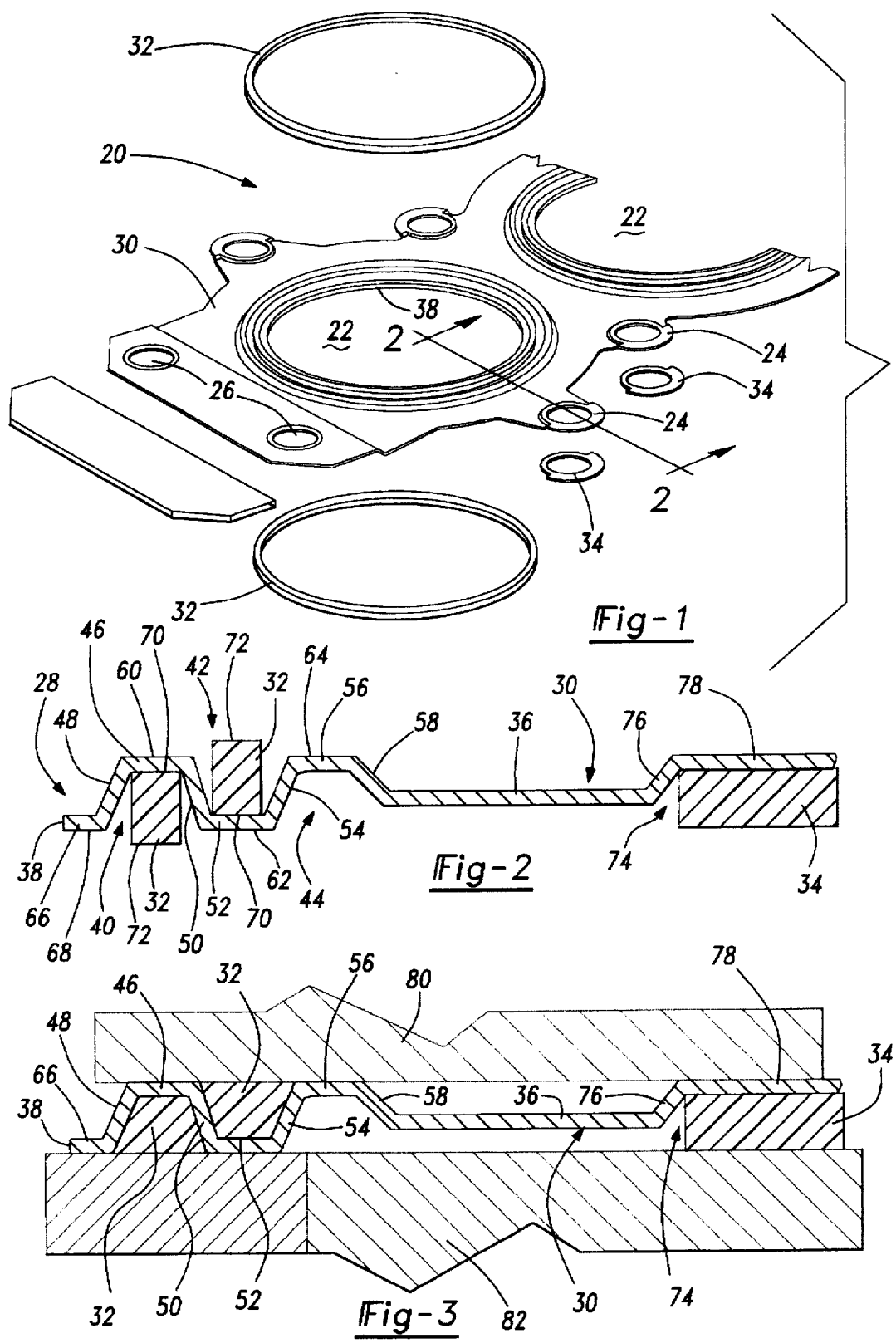

RUBBER/METAL COMBUSTION SEAL

FIELD OF THE INVENTION

The present invention relates to a cylinder head gasket for an internal combustion engine. More particularly, the invention relates to a combustion seal for the gasket including a corrugated rigid carrier having an elastomeric ring received in at least one channel, the ring adapted to substantially fill the channel upon elastic compression of the ring.

BACKGROUND OF THE INVENTION

Gaskets are often used as a seal between mating mechanical components. One common application involves gasket placement between the engine block and cylinder head of an internal combustion engine. Cylinder head gaskets typically extend around cylinder bores to provide a combustion seal, maintaining the high temperature gases of combustion within the cylinder bores. Simultaneously, the gaskets also seal fluid flow openings such as coolant and oil openings to prevent undesirable mixing. A cylinder head gasket bears the load from a bolted connection of the mechanical components and relies upon that load to provide both the combustion and fluid flow seals.

Known gaskets use several types of combustion seal rings. One type of ring, known as a yieldable combustion seal ring, is essentially comprised of a wire having a generally circular cross-sectional area. The wire may be enclosed within a metallic generally U-shaped flange with opposing legs engaging opposite faces of a main gasket body. A clamping force applied to such a ring is concentrated at the point of contact, deforming the ring's circumference to seal out combustion gases. However, a yieldable combustion seal ring is subject to thermal crushing which produces undesirable additional plastic deformation which may compromise sealing performance.

Other known gaskets utilize continuous sealing beads which surround a combustion opening. The sealing beads are integrally formed into the main gasket body. As with the yieldable combustion seal ring, a clamping force applied to such a ring is concentrated at the point of contact to seal out combustion gases. However, the clamping load required to seal out combustion gases tends to promote undesirable gasket distortion.

SUMMARY OF THE INVENTION

The present invention is directed to a cylinder head gasket of an internal combustion engine having at least one cylinder bore opening. The gasket is clamped between a cylinder head and an engine block.

A combustion seal for the cylinder head gasket comprises a rigid corrugated carrier having a radially extending base portion, a radially innermost peripheral edge defining a portion of the cylinder bore opening, and three channels defined radially inwardly of the base portion and radially outwardly of the inner peripheral edge. The radially innermost and outermost channels open in a first axial direction and the channel disposed between them opens in an opposite axial direction. Each of the channels has a root defined between adjacent walls with a wall shared between adjacent channels.

Preferably, each of the channels are generally trapezoidal with the roots extending generally parallel to the base portion of the carrier and each of the walls extending at an angle radially away from the root. The channels include an axially outermost extent equally spaced from the base portion such that the base portion is axially centered. Optionally, a lip is defined between the peripheral edge of the carrier and one of the walls, the lip extending generally parallel to the base portion and aligned with the axial outermost extent of at least one of the channels.

The combustion seal further includes a plurality of elastomeric rings, a ring received in all but the radially outermost channel. A first face of the rings is placed in facial contact with the root of the groove in which it is received while an opposing second face is defined outwardly of the channel when the ring is in a relaxed state. Preferably, the ring is further sized such that in a relaxed state it is spaced away from the walls of the channel but substantially fills the channel upon elastic compression of the seal. The combustion seal may also include a channel defined by an angled wall and a root which is spaced on an opposite side of the base portion of the carrier. A load stop shim is received within the channel such that a combined axial thickness of the shim and the carrier is approximately equal to the axial extent of each of the channels having an elastomeric ring.

As a result of the design of the combustion seal, it is the elastomeric rings and not the carrier which is subject to substantial axial deformation when the cylinder head gasket is installed between a cylinder liner and an engine block. As a result, during a combustion cycle the minute upper movement of the cylinder head is followed by the rings and portions of the carrier through the natural recovery characteristics and in hydraulic response of the elastomeric material to the combustion gas or fluid flow pressure.

The preferred elastomeric material for the rings is high temperature rubber. However, to provide additional protection even if a high temperature rubber is used, the combustion seal includes a flame barrier comprising the lip and the wall to which the lip is attached. In practice, the lip and the radially innermost channel with its ring acts as a primary seal against compression gas penetration. However, some combustion gases tend to pass between the outermost extent of the channel and the meeting component because of the nature of the interface. These combustion gases are trapped by means of the secondary seal in the form of the intermediate channel and the ting which are oriented in the opposite axial direction.

By having the combustion seal including both channels and their respective elastomeric rings, the clamping required to provide a satisfactory seal is greatly reduced when compared to more conventional cylinder head gaskets. Lower clamping loads reduce bore distortion and improve engine performance. Further, the gasket of the present invention can seal higher combustion pressures when compared to conventional gaskets under the same clamping load. Therefore, the gasket may be used in higher pressure environments.

BRIEF DESCRIPTION OF THE DRAWINGS

The features and inventive aspects of the present invention will become more apparent upon reading the following detailed description, claims, and drawings, of which the following is a brief description:

FIG. 1 is a perspective view a gasket incorporating the present invention.

FIG. 2 is a cross-sectional view of a portion of the gasket in a relaxed state along lines 2—2 in FIG. 1.

FIG. 3 is a cross-sectional view of the gasket of FIG. 2 installed between a cylinder head and engine block.

DETAILED DESCRIPTION OF A PREFERRED EMBODIMENT

A cylinder head gasket 20 is illustrated in a relaxed state in FIGS. 1 and 2. Gasket 20 includes generally annular cylinder bore openings 22, fastener holes 24, and fluid flow openings 26. To seal the cylinder bores of an internal combustion engine, gasket 20 has an annular combustion seal 28 preferably formed from a corrugated rigid metal carrier 30, elastomeric rings 32, and an optional load stop shim 34.

Combustion seal 28 is shown in greater detail in FIG. 2. Carrier 30 includes a radially extending base portion 36 and a radially innermost peripheral edge 38 which defines a portion of a cylinder bore opening 22. Carrier 30 is corrugated, having three channels 40, 42, and 44 disposed radially inwardly of base portion 36 and radially outwardly of peripheral edge 38. Channels 40 and 44 open axially downwardly while channel 42, disposed between channels 40 and 44, opens axially upwardly. Each of the channels has a root defined between adjacent walls. Channel 40 has a root 46, a radially inner wall 48 and a radially outer wall 50. Channel 42 has a root 52, shares wall 50 with channel 40, and has a radially outer wall 54. Channel 44 has a root 56, shares wall 54 with channel 42, and has a radially outer wall 58 that terminates at base portion 36. Thus, each of the channels shares a wall with an adjacent channel.

Preferably, channels 40, 42, and 44 are generally trapezoidal, with roots 46, 52, and 56 extending generally parallel to base portion 36. Walls 48, 50, 54, and 58 all extend radially and axially away from each of the roots to which they are attached. In the illustrated embodiment, each of the walls share a common angle with the respective root. Channels 40, 42, and 44 each have an axial outermost extent 60, 62, and 64, respectively. Preferably, outermost extents 60, 62, and 64 are all equally spaced from base portion 36 such that the base portion is axially centered between outermost extents 60 or 64, which are aligned with another, and outermost extent 62.

Combustion seal 28 also includes a lip 66 defined between inner peripheral edge 38 and wall 48. Lip 66 is preferably aligned with root 52 such that it has an outermost extent 68 aligned with outermost extent 62.

As best shown in FIG. 2, combustion seal 28 includes two high temperature resistant elastomeric rings 32. A first ring is received in downwardly extending channel 40 while a second ring is received in upwardly extending channel 42. A first face 70 of each ring 32 is in facial contact with its corresponding root 46 or 52 while a second face 72 extends axially outwardly of the channel. As shown in FIG. 2, rings 32 in a relaxed state have a greater axial thickness than the axial extent of either groove 40 or 42. They are also preferably spaced away from the corresponding walls of the channel in which they are received.

As best shown in FIGS. 2 and 3, carrier 30 includes a channel 74 defined by an angled wall 76 and a root 78. Base portion 36 is disposed between channel 44 and channel 74. Preferably, root 78 is axially spaced to be in line with either roots 46 and 56 or root 52. Optional shim 34 is received in and in facial contact with root 78 of channel 74. In the illustrated embodiment, a combined axial thickness of shim 34 and carrier 30 is approximately equal to the axial extent of each of channels 40, 42 and 44 as measured from base portion 36. Shim 34 is preferably used in the present invention to reduce the load applied to the combustion seal 28.

The use of shim 34 in combination with carder 30 is best shown in FIG. 3 where gasket 20 is installed between a cylinder head 80 and an engine block 82. Preferably, carrier 30 and more specifically, channels 40, 42, 44, and 74 are subjected to little or no distortion when subjected to a clamping load of the cylinder head bolts. Lip 66, roots 46, 52, 56, and a combination of shim 34 and root 78, provide substantial surface contact between the carrier and the mating part to limit such distortion. As a result, carrier 30 provides radial strength and constant operating thickness for seal 28. Further, substantial surface contact between carrier 30 and the mating parts also promotes heat dissipation away from gasket 20.

As further illustrated in FIG. 3, it is rings 32, and not carrier 30 which are subject to substantial axial deformation when gasket 20 is installed. Rings 32 are sized to be elastically compressed to fill channels 40 and 42, respectively, upon installation such that they are generally flush with the walls of the channel in which they are received. In practice, elastic rings of generally rectangular cross-section in a relaxed state have been found to be particularly desirable. As a result, during a combustion cycle the minute upper movement of cylinder head 80 is followed by rings 32, roots 46, 52, 56, and lip 66, of carrier 30 through their natural recovery characteristics and in hydraulic response of the elastomeric material to the combustion gas or fluid flow pressure.

A preferred elastomeric material for rings 32 is high temperature rubber. However, to provide additional protection even if a high temperature rubber is used, seal 28 includes a flame barrier comprising lip 66 and wall 48. In practice lip 66, channel 40 and the radially inward ring 32 act as a primary seal against compression gas penetration. Some combustion gases tend to pass between the outermost extent 60 of channel 40 and cylinder liner 80 because of the nature of the interface. These combustion gases are trapped by means of a secondary seal in the form of channel 42 and its ring 32 which are oriented in the opposite axial direction.

By having combustion seal 28 including elastomeric rings 32, the clamping load required to provide a satisfactory seal is greatly reduced when compared to more conventional cylinder head gaskets. Lower clamping loads reduce bore distortion and improve engine performance. Gasket 20 can seal higher combustion pressures when compared to conventional gaskets under the same clamping load. Therefore, the gasket may be used in more demanding environments.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed:

1. A combustion seal for a cylinder head gasket of an internal combustion engine having at least one cylinder bore opening, said seal comprising:

a rigid carrier having a radially extending base portion, a radially innermost peripheral edge defining a portion of said cylinder bore opening, and at least one channel defined radially inwardly of said base portion and radially outwardly of said inner peripheral edge, said channel having a root defined between adjacent walls, wherein said root is axially displaced relative to said base portion; and an elastomeric ring received in said channel, a first face of said ring in facial contact with said root and an opposing second face defined outwardly of said channel when said seal is in a relaxed state, wherein said ring is sized in said relaxed state to be spaced away from said walls of said channel.

2. A combustion seal as recited in claim 1, wherein said ring is sized to substantially fill said channel upon elastic compression such that said ring is generally flush with said walls of said channel.

3. A combustion seal as recited in claim 2, wherein said channel is generally trapezoidal, said root extending generally parallel to said base portion of said carrier and each of said walls extending at an angle radially away from said root.

4. A combustion seal as recited in claim 3, wherein said ring has a generally rectangular cross section, a radial extent of said ring corresponding generally to said radial extent of said root.

5. A combustion seal as recited in claim 1, wherein a lip is defined between said peripheral edge of said carrier and one of said walls.

6. A combustion seal as recited in claim 5, wherein said lip extends generally parallel to said base portion of said carrier.

7. A combustion seal for a cylinder head gasket of an internal combustion engine and having at least one cylinder bore opening, said seal comprising:

a rigid carrier having a radially extending base portion, a radially innermost peripheral edge defining a portion of said cylinder bore opening, and a plurality of channels defined radially inwardly of said base portion and radially outwardly of said inner peripheral edge, a first of said channels opening upwardly and a second of said channels opening downwardly, each of said channels having a root defined between adjacent walls; and a plurality of elastomeric rings, said rings received in more than one of said channels, a first face of said rings in facial contact with said root and an opposing second face defined outwardly of said channels when said seal is in a relaxed state.

8. A combustion seal as recited in claim 7, wherein each of said channels have an axial outermost extent equally spaced from said base portion such that said base portion is axially centered.

9. A combustion seal as recited in claim 8, wherein said seal includes a load stop shim, said shim sized such that a combined thickness of said shim and said carrier is approximately equal to the axial extent of one of said channels spaced away from said base portion of said carrier.

10. A combustion seal as recited in claim 9, wherein said base portion is disposed between said channels and said shim.

11. A combustion seal as recited in claim 7, wherein each of said channels are generally trapezoidal, said roots extending generally parallel to said base portion of said carrier and each of said walls extending at an angle radially away from said roots.

12. A combustion seal as recited in claim 11, wherein a lip is defined between said peripheral edge of said carrier and one of said walls.

13. A combustion seal as recited in claim 11, wherein said first and second channels share a common wall.

14. A combustion seal as recited in claim 13, wherein a third channel is disposed between said second channel and said base portion, said third channel having a wall in common with said second channel.

15. A combustion seal as recited in claim 13, wherein said roots are displaced axially with respect to said base portion.

16. A combustion seal as recited in claim 7, further comprising a plurality of elastomeric rings, a ring received in all but said radially outermost channel, a first face of said rings in facial contact with said root and an opposing second face defined outwardly of said channels when said seal is in a relaxed state.

17. A combustion seal for a cylinder head gasket of an internal combustion engine and having at least one cylinder bore opening, said seal comprising:

a rigid carrier having a radially extending base portion, a radially innermost peripheral edge defining a portion of said cylinder bore opening, and a plurality of channels defined radially inwardly of said base portion and radially outwardly of said inner peripheral edge, a first of said channels opening upwardly and a second of said channels opening downwardly, each of said channels having a root defined between adjacent walls;

a plurality of elastomeric rings, said rings received in more than one of said channels, a first face of said rings in facial contact with said root and an opposing second face defined outwardly of said channels when said seal is in a relaxed state; and a load stop shim received in a third of said channels spaced away from said first two channels, said shim sized such that a combined thickness of said shim and said carrier is approximately equal to the axial extent of each of said channels spaced away from said base portion of said carrier.

18. A combustion seal as recited in claim 17, wherein each of said roots is equally spaced from said base portion such that base portion is axially centered.

19. A combustion seal as recited in claim 18, wherein said base portion is disposed between said first two channels and said third channel containing said shim.

20. A combustion seal as recited in claim 19, wherein a lip is defined between said peripheral edge and one of said channels.

21. A combustion seal as recited in claim 10, wherein said seal includes a third channel, said load stop shim received in said third channel.

* * * * *